(12) United States Patent
Leabeater et al.

(10) Patent No.: US 8,623,259 B2
(45) Date of Patent: Jan. 7, 2014

(54) CONTAINER MOULDING ARRANGEMENT

(75) Inventors: Michael Patrick Leabeater, Kurmond (AU); Peter Mandavy, Prestons (AU)

(73) Assignee: ASP Plastics Pty Limited, St. Marys, NSW (AU)

( * ) Notice: Subject to any disclaimer, the term of this patent is extended or adjusted under 35 U.S.C. 154(b) by 152 days.

(21) Appl. No.: 12/911,824

(22) Filed: Oct. 26, 2010

(65) Prior Publication Data
US 2011/0095036 A1 Apr. 28, 2011

(30) Foreign Application Priority Data

Oct. 26, 2009 (AU) ................. 2009905206

(51) Int. Cl.
*B29C 45/76* (2006.01)

(52) U.S. Cl.
USPC .................... 264/328.7; 264/328.9

(58) Field of Classification Search
USPC .......... 264/328.7–328.9, 328.12, 40.1, 328.1
See application file for complete search history.

(56) References Cited

U.S. PATENT DOCUMENTS

| 4,107,257 | A | * | 8/1978 | Swin, Sr. | 264/275 |
| 4,743,420 | A | * | 5/1988 | Dutt | 264/102 |
| 5,510,065 | A | | 4/1996 | McFarlane | |
| 5,846,573 | A | | 12/1998 | Wurst et al. | |
| 2005/0236725 | A1 | | 10/2005 | Niewels et al. | |

FOREIGN PATENT DOCUMENTS

| JP | 02086417 A | 3/1990 |
| JP | 08183070 A | 7/1996 |

OTHER PUBLICATIONS

UK Intellectual Property Office, Search Report under Section 17(5), dated Feb. 14, 2011.

* cited by examiner

*Primary Examiner* — Larry Thrower
*Assistant Examiner* — Xue Liu
(74) *Attorney, Agent, or Firm* — Design IP

(57) ABSTRACT

A method of injection moulding a plastics container 1 having wall(s) 2 of substantially uniform thickness using an injection mould 10 with an unsupported core 12 is disclosed. A small sliver 17 is removed from the free end of the core 12 of the mould 10 from that side of the wall which is thinnest. As a consequence on the next injection more plastic flows in that direction. Repeated optical inspection of the containers enables a balance to be achieved in which slightly asymmetric injection conditions are balanced by a slightly asymmetric container base with the result being a container with substantially uniform wall thickness.

8 Claims, 2 Drawing Sheets

CONTAINER MOULDING ARRANGEMENT

FIELD OF THE INVENTION

The present invention relates to containers formed by injection moulding of plastics material such as polypropylene, and the like.

BACKGROUND ART

Such containers generally have a base and side walls (in the event of a cylindrical container then there is only a single side wall) and are formed from a mould having an interior and a core which extends into the mould. The core is said to be unsupported in the sense that the only support for the core is at one end of the mould and thereafter the core does not come in contact with the interior of the mould. The space between the core and the mould interior is the space which receives the plastic which will form the side walls and base of the container. Normally the injection point or points at which the molten plastic is injected into the mould are located in the base since this means that the marks formed at the point of injection are not visible when the container is upright in its normal condition.

Normally during the moulding process, the flow of plastic into the mould is not exactly even in all directions and thus molten plastic flows more to one side of the core than the other. As a consequence of this uneven flow the core deforms slightly so as to bend away from the side which has the more plastic and towards the side which has the less plastic. The consequence of this is that the moulded plastics container has side wall(s) which are not exactly uniform.

This lack of uniformity is generally only visible by holding the container up to the light and observing the light transmission through the side walls of the container. The thinner portions of the wall are naturally lighter in color since they transmit more light than the thicker portions of the wall.

For most containers this small difference in wall thickness, typically a very small fraction of a millimeter, is of no consequence to the operation of the container and is easily tolerated as a non-consequential manufacturing defect.

However, a particular class of container, known as "sharps" containers are intended for the disposal of syringes which have extremely sharp needle points. Examples of such containers are those illustrated in Australian Patent No. 741,793 and in the first four drawings of the present specification. Such containers may or may not have an interior partition which divides the container into two, namely one compartment containing unused syringes and the other compartment containing used syringes.

Outside of the hospital and medical systems, there are two types of persons who regularly use syringes for the self-administration of drugs. These are essentially diabetics and intravenous drug addicts. Diabetics are insulin-dependent and require a regular injection of insulin in order to maintain their blood sugar levels. Intravenous drug addicts are dependent upon a drug such as heroin and regularly inject themselves in order to maintain a sense of euphoria.

Both classes of persons carry syringes about them from place to place and thus require a portable means of safe disposal of the syringes after the injection has taken place. For diabetics this is relatively straight forward since the syringes are not in themselves normally infected and thus it is a matter of preventing the needle tip from puncturing anything or anybody.

However, for intravenous drug users, there is a high likelihood that the syringe is infected with either Hepatitis C or HIV AIDS, or both, and thus members of the general public should be protected from the possibility of needle stick injury which may result in permanent and even fatal infection.

It is therefore highly desirable from a public health point of view that intravenous drug users not leave infected syringes lying about in public places such as parks, beaches, and the like where they can be accidentally stepped upon by members of the general public. Thus it is desirable from a public health point of view that intravenous drug users, as well is diabetics, be able to safely dispose of syringes after they have been used. Thus there is a need for an inexpensive portable used syringe container device.

Furthermore, modern and more enlightened public health policy is to prevent, as much as possible, intravenous drug users from sharing needles since this can prevent the spread of Hepatitis C and HIV AIDS. It is therefore desirable that used syringe container devices have a one-way locking arrangement which prevents used syringes once they are inserted in the container, from then being extracted from the container for re-use.

In addition, many intravenous drug users are eventually able to resist and overcome their addiction. Thus if they can be maintained healthy by not contracting Hepatitis C or HIV AIDS whilst they are addicted, this can greatly assist their eventual recovery.

Another aspect of public health is the need to protect the health of sanitary workers such as garbage collectors who may accidentally, or who may routinely be required to, come into contact with such used syringe container devices. Thus there is a desirable public health outcome if such used syringe containers are able to withstand moderate force and thus can retain the point of the needle within the container. In this way, the incidence of needle stick injuries, even of gloved hands, can be lessened.

It has been observed by the present inventors that when such sharps containers are crushed, for example, by garbage compacting devices, there is a propensity for the needle points of the used syringes disposed of therein to penetrate the side walls at those locations where the side walls are the thinnest. Another situation where such containers may be crushed is when seat belt wearing motorists carry such containers in a breast pocket and under a seat belt prior to a motor vehicle accident.

GENESIS OF THE INVENTION

The genesis of the present invention is the desire to improve the performance of sharps containers, in particular, when crushed by a seat belt or by garbage handling apparatus. In particular, if a sharps container is provided with substantially uniform side walls them no one location is more likely than another to yield to the urging of needles to penetrate the side wall. In this connection it should be noted that the base of such containers is normally much thicker than the side wall and therefore needle penetration through the base is not a problem.

SUMMARY OF THE INVENTION

It is towards the abovementioned desire for such containers with substantially uniform side walls that the present invention is directed.

In accordance with a first aspect of the present invention there is disclosed a method of injection moulding a container having side walls of substantially uniform thickness and a base from a mould having an interior and an unsupported core extending into said mould interior, said method comprising the steps of:

(i) injection moulding a trial container and ejecting same from the mould;

(ii) observing which portion of the side walls of said trial container is thinner than the remainder thereof;

(iii) removing a small amount of material from a portion of said mould forms the base of said container to slightly re-direct towards said thinner portion the molten plastic entering said mould;

(iv) repeating step (i); and (v) repeating steps (ii) to (iv) as necessary until said ejected trial container has substantially uniform side walls.

In accordance with a second aspect of the present invention there is disclosed a container moulded by the abovementioned method.

BRIEF DESCRIPTION OF THE DRAWINGS

A preferred embodiment of the present invention will now be described, with reference to the accompanying drawings in which.

DETAILED DESCRIPTION OF THE PREFERRED EMBODIMENTS

Figure 1:
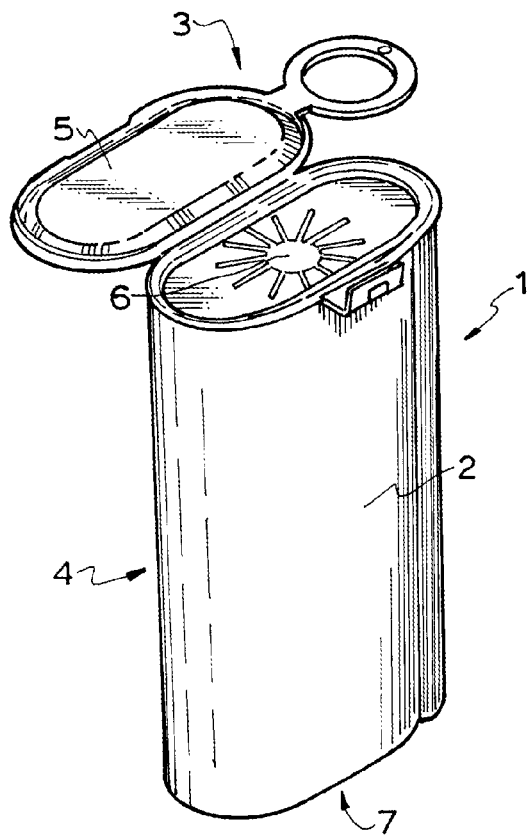
FIG. 1 is a front perspective view from above, with the lid open, of a prior art sharps container.
Figure 2:
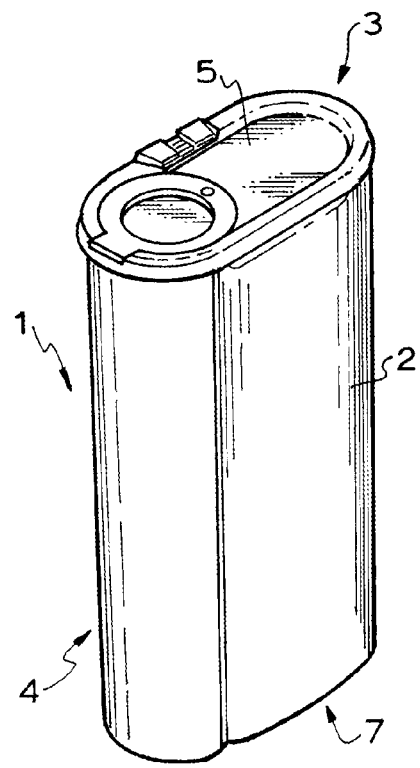
FIG. 2 is a rear perspective view from above, with the lid closed, of the prior art sharps container of FIG. 1.
Figure 3:
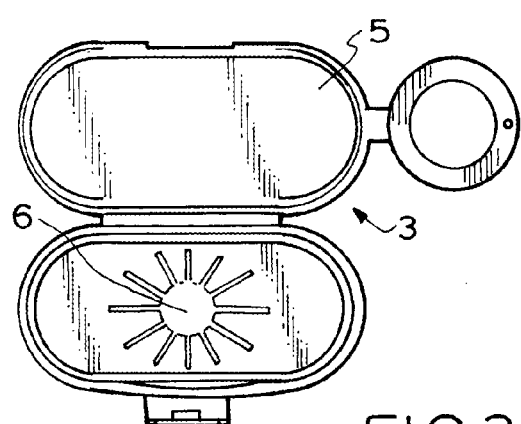
FIG. 3 is a plan view with the lid open of the prior art sharps container of FIGS. 1 and 2.
Figure 4:
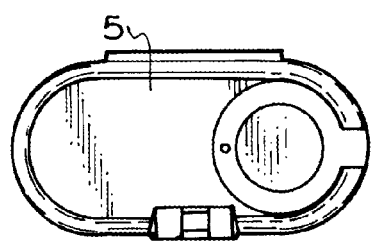
FIG. 4 is a plan view with the lid closed on the prior art sharps container of FIGS. 1 to 3.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms are used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

As seen in FIGS. 1 to 4, a prior art sharps container 1 has a top 3 and a container body 4 with a side wall 2. The container body 4 and top 3 are each independently injection moulded and are subsequently brought together and joined, for example, by means of ultrasonic welding. The top 3 has a hinged lid 5 and a one way syringe orifice 6 which enables the disposal of used syringes in a substantially safe manner. Not illustrated in FIGS. 1 to 4 but interconnecting the side walls 2 is a base 7 for the container body 4.

Figure 5:
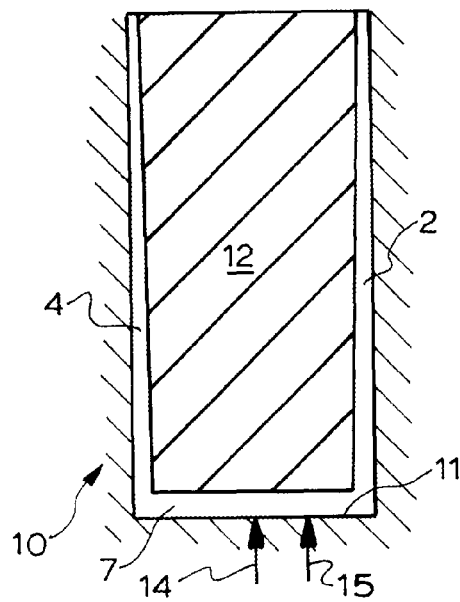
FIG. 5 is a longitudinal cross-sectional view through a mould from which a sharps container such as that illustrated in FIGS. 1 to 4 can be moulded, only the mould cavity being illustrated, and the mould cavity being that of the prior art.

Turning now to FIG. 5, a cross-sectional view through the mould interior used to mould the body 4 of the container 1 is illustrated schematically. It will be appreciated by those skilled in the art that the mould 10 has an interior 11 and an unsupported core 12 which projects into the mould interior 11. The gap between the mould interior 11 and the core 12 defines the shape of the body 4 with its side wall 2 and base 7.

Illustrated in FIG. 5 by means of the designations 2 and 7 are the portions of the mould 10 in which the corresponding side walls 2 and base 7 of the container body 4 are formed during the moulding process. Two injection points 14, 15 indicated by arrows in FIG. 5 are provided in the mould adjacent that portion of the mould body which will form the base 7.

Figure 6:
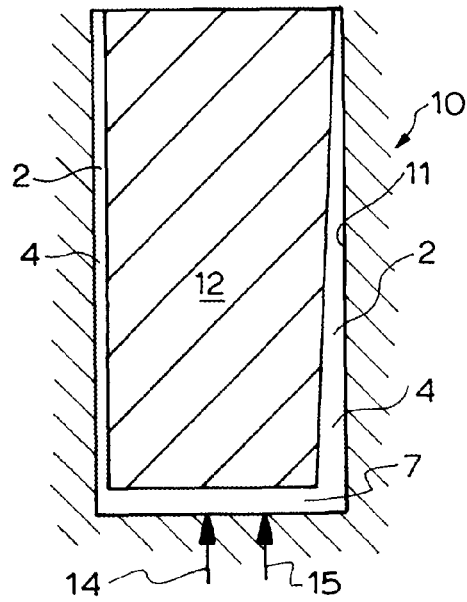
FIG. 6 is a view similar to FIG. 5 but illustrating the deflection of the core as a result of uneven entry of the molten plastics material into the mould cavity.

FIG. 6 illustrates in the exaggerated fashion what happens during the moulding of the container body 4. With reference to FIG. 6, molten plastic can be visualized as entering into the mould 10 via the injection points 14 and 15. Instead of being entirely an even flow as desired, the flow is more to the right as seen in FIG. 6 than to the left. Since the molten plastic is under high pressure, the flow which is more to the right in FIG. 6 defects the core 12 to the left as seen in FIG. 6. This has the consequence that the left hand side wall 2 in FIG. 6 is thinner than the resulting right hand side wall 2 because of this deflection of the core 12.

It is known to cure this problem of non-uniform side wall thickness by means of fabricating one or more openings formed in the base 7 which permit a pin or like supporting structure to be passed into the mould interior and thereby support the free end of the core 12. However, such pins results in corresponding openings in the base 7 and this is undesirable for a "crush survivable" sharps container since it would enable needle tips to pass through the resulting openings.

Figure 7:
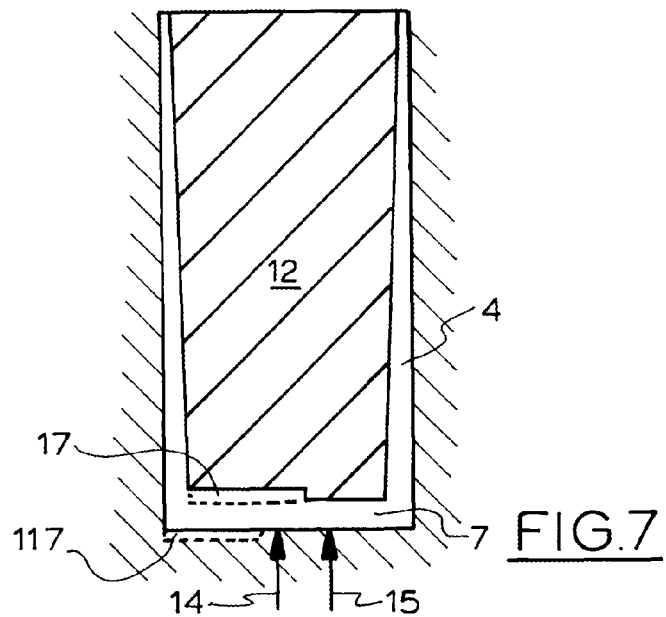
FIG. 7 is a view similar to FIGS. 5 and 6 but illustrating the core modified in accordance with the preferred embodiment of the present invention.

Instead of providing such a core support, a trial container is moulded, ejected from the mould and then examined to see which portions of the side wall 2 are thin and which are thick. With reference to FIGS. 6 and 7, since the side wall is thin on the left hand side of FIG. 6 and thick on the right hand side of FIG. 6, so the free end of the core 2 has a thin sliver 17 filed or ground away from the free end of the core 12 as indicated by broken lines in FIG. 7 (but to an exaggerated scale). The size of the sliver 17 removed is a very small fraction of a millimeter but it is removed on the side of the core 12 which corresponds to the thinnest portion of the side wall 2.

After the sliver 17 has been removed, a second trial container is fabricated from the mould with the injection conditions unchanged, and the resulting side wall 2 is again examined by holding the container 1 up to the light. If it is found, for example, that the side wall 2 is still thin on the left hand side as seen in FIG. 6, then a further sliver 17 is ground away and the process repeated. The process is continuously repeated until the side wall 2 is substantially uniform when the container 1 is viewed whilst being held up to the light. The removal of the sliver 17 means that the base 7 of the container body 4 is a little thicker on the left hand side with reference to FIGS. 6 and 7 than the right, however, this manufacturing non-uniformity is of no consequence.

What is of substantial consequence, is that the side wall 2 is now substantially uniform and therefore in the event that the container 1 is crushed there is no inherent point of weakness at one location of the side wall 2 relative to the remainder of the side wall. Thus the propensity for needle tips to project through the side wall 2 is substantially reduced.

The foregoing describes only one embodiment of the present invention and modifications, obvious to those skilled in the plastic moulding arts, can be made thereto without departing from the scope of the present invention.

For example, rather than grind a sliver 17 from the free end of the core, an equivalent sliver can be ground off the base of the mould opposite the free end of the core as indicted at 117 of FIG. 7.

The term "comprising" (and its grammatical variations) as used herein is used in the inclusive sense of "including" or "having" and not in the exclusive sense of "consisting only of".

While the principles of the invention have been described above in connection with preferred embodiments, it is to be clearly understood that this description is made only by way of example and not as a limitation of the scope of the invention.

The invention claimed is:

1. A method of injection moulding a container having side walls of substantially uniform thickness and a base from a mould having an interior and an unsupported core extending into said mould interior, said method comprising the steps of:
   (i) injection moulding a trial container and ejecting same from the mould;
   (ii) observing which portion of the side walls of said trial container is thinner than the remainder thereof;
   (iii) removing a small amount of material from a portion of said mould which forms the base of said container to slightly re-direct towards said thinner portion molten plastic entering said mould;
   (iv) repeating step (i); and
   (v) repeating steps (ii) to (iv) as necessary until said ejected trial container has substantially uniform side walls.

2. The method as claimed in claim 1 wherein said portion of said mould is from a free end of said unsupported core.

3. A method as claimed in claim 1 wherein said portion of said mould is from a base of said mould opposite a free end of said unsupported core.

4. The method as defined in claim 1,
   wherein step (i) further comprises injection moulding the trial container under at least one injection condition, and step (iv) further comprises repeating step (i) under the same at least one injection condition.

5. A method of injection moulding a finished container from a mould having an interior and an unsupported core that extends into said interior, the finished container having side walls of a substantially uniform thickness and a base, said method comprising the steps of:
   (i) injection moulding a trial container from a plastic material in said mould and removing said trial container from said mould, said trial container having side walls and a base;
   (ii) determining which portion of said side walls of said trial container is a thinner portion than a remainder thereof;
   (iii) removing a small amount of material from a portion of said mould that forms said base of said trial container so that in subsequent iterations of step (i), said plastic material is directed towards said thinner portion;
   (iv) repeating step (i); and
   (v) repeating steps (ii) to (iv), as necessary, until said trial container has substantially uniform side walls, thereby forming said finished container.

6. The method as claimed in claim 5 wherein step (iii) further comprises removing said small amount of material from a free end of said unsupported core.

7. A method as claimed in claim 5 wherein step (iii) further comprises removing said small amount of material from a base of said mould opposite a free end of said unsupported core.

8. The method as defined in claim 5,
   wherein step (i) further comprises injection moulding the trial container under at least one injection condition, and step (iv) further comprises repeating step (i) under the same at least one injection condition.

\* \* \* \* \*